E. CROSS.
ELECTRICALLY PROPELLED ROAD VEHICLE.
APPLICATION FILED JUNE 6, 1914.

1,154,293.

Patented Sept. 21, 1915.
3 SHEETS—SHEET 1.

WITNESSES.
S. C. McBride
M. W. Brakhagen

INVENTOR.
Edward Cross
by Foster Freeman Watson Stout
Atty.

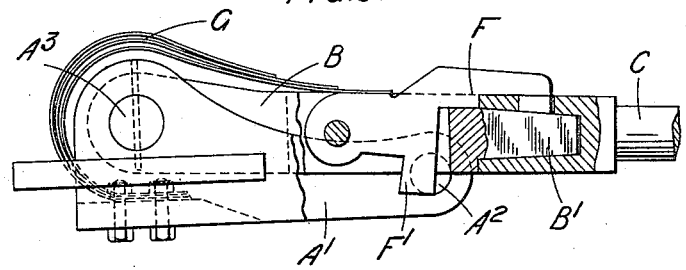
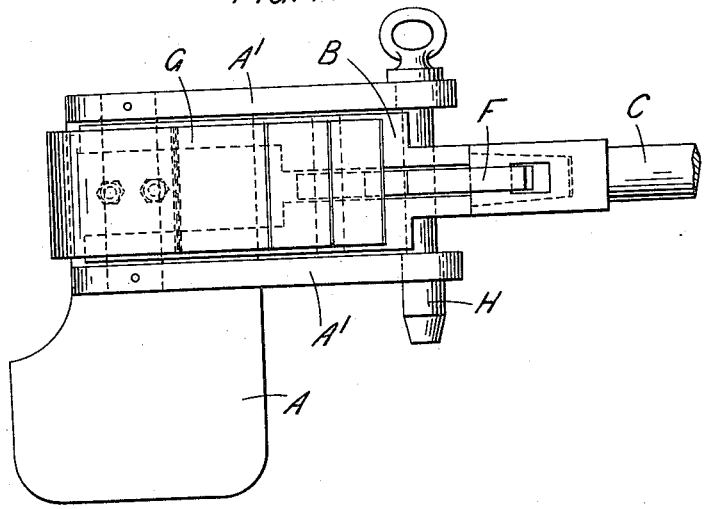

E. CROSS.
ELECTRICALLY PROPELLED ROAD VEHICLE.
APPLICATION FILED JUNE 6, 1914.
1,154,293.
Patented Sept. 21, 1915.
3 SHEETS—SHEET 3.
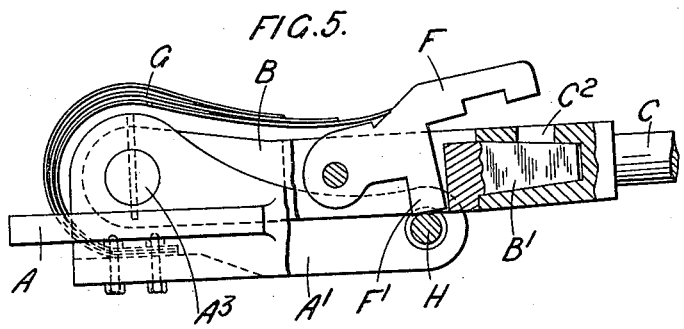
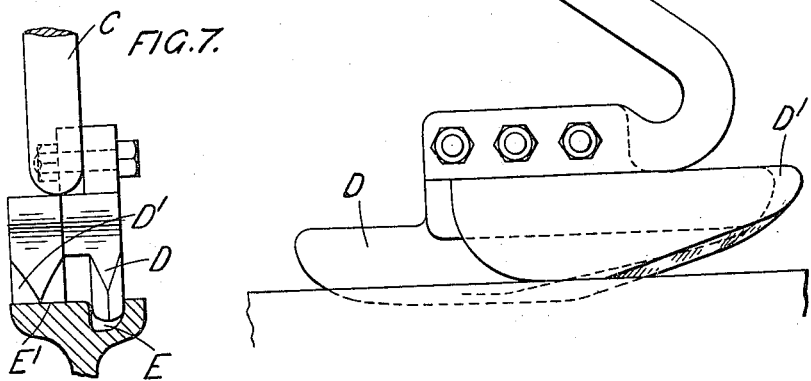
WITNESSES.
INVENTOR.
Edward Cross

UNITED STATES PATENT OFFICE.

EDWARD CROSS, OF ROTHERHAM, ENGLAND.

ELECTRICALLY-PROPELLED ROAD-VEHICLE.

1,154,293.  Specification of Letters Patent.  Patented Sept. 21, 1915.

Application filed June 6, 1914. Serial No. 843,546.

*To all whom it may concern:*

Be it known that I, EDWARD CROSS, subject of the King of England, residing at Rotherham, York, in England, have invented certain new and useful Improvements in Electrically-Propelled Road-Vehicles, of which the following is a specification.

This invention relates to electrically propelled road vehicles and has particular reference to vehicles which normally obtain their power from overhead conductors and run on ordinary road wheels without the provision of rails. Such vehicles are often used in conjunction with an electric tramway system and are sometimes provided with rail contacts or current-collecting arms which enable them to make electrical connection with the rails. In some cases the current-collecting arm is connected to the steering axle of the vehicle so that as the wheel or runner of the arm follows the grooved tramway rail it may operate upon the steering road wheels of the vehicle. The present invention has for its object the construction of a simple and efficient form of such a current-collecting and steering apparatus.

The apparatus according to this invention comprises a pivoted spring-controlled member or socket operatively connected to the stud axle of a steering road wheel, a detachable arm and a runner or shoe engaging both with the groove and with the flat portion or table of the rail. The pivoted socket is provided with a retaining trigger or catch which prevents the arm from being detached while in its operative position but is capable of being raised out of engagement in the manner hereinafter described when the arm is raised.

The shoe or runner has two parts which are preferably integral with each other and these are so shaped and disposed that any dirt or mud which may be cleared out of the groove by the action of the one part is not likely to be thrown between the face of the other, current-collecting part, and prevent it from making good electrical contact with the rail.

Figure 1:
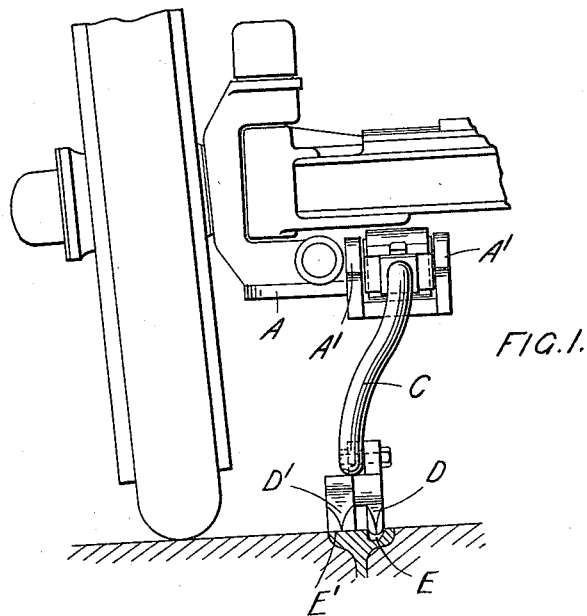
Figure 2:
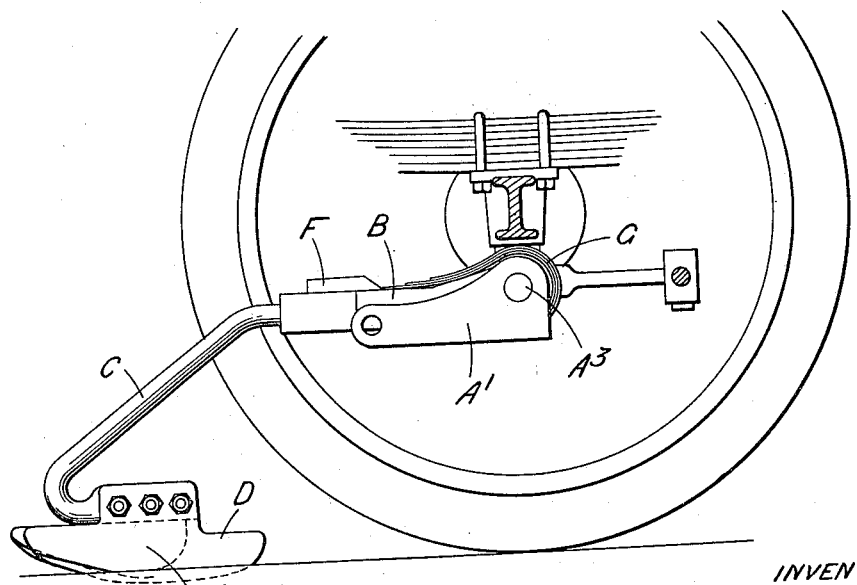

In the accompanying drawings, Figure 1 is a front elevation showing a current-collecting and steering arm according to this invention in place on part of a vehicle. Fig. 2 is a side elevation. Fig. 3 is a side elevation partly in section showing the upper portion of the apparatus. Fig. 4 is a plan of the same. Fig. 5 is a view corresponding to Fig. 3 but showing the apparatus in another position. Fig. 6 is a side elevation of the detachable arm and shoe, and Fig. 7 is an end view of the front of the shoe. Figs. 3 to 7 are drawn to a larger scale than Figs. 1 and 2.

With reference first to Figs. 1 to 5, A is a plate or bracket adapted to be bolted or otherwise secured to the stud axle of the steering road wheel or some part in rigid connection therewith. This member A carries two lugs A' having pivoted between them a block or socket B. The end of this socket B is adapted to receive the upper extremity of a detachable arm C carrying at its lower end a runner or shoe. This shoe comprises two parts which are preferably integral with each other one portion D being adapted to engage with the groove E in the rail while the other portion D' bears upon the flat part or table E' of the rail head (Fig. 7). The fronts of the parts D and D' are sloped and beveled as shown in Figs. 6 and 7 and it will be seen by reference to Fig. 6 that the part D' which acts as the current collector by making contact with the table E' of the rail head has a slight lead in advance of the portion D' which acts as the steering member by traveling in and engaging with the groove E. The object of this disposition of the two parts of the shoe is to prevent any dirt or mud which may be cleared out of the groove E by the member D from being thrown beneath the flat surface of the member D' and the rail surface.

The upper end of the arm C is furnished with a square tapered recess C' which fits over a plug B' at the end of the member B and in order to lock the arm in engagement with the member B the latter has mounted upon it a pivoted trigger F the nose of which is adapted to engage with a hole C² (Fig. 5) in the upper part of the end of the arm. The trigger F is acted upon by a spring G and when the apparatus is in the operative position and the trigger down as shown in Fig. 3, the spring G acts also upon the block or socket B and presses the whole apparatus downward so that the shoe D D' is pressed into engagement with the rail.

The trigger F is provided with a downwardly pointing projection F' which extends between the lugs A' and into the path of a pin H which fits into holes A² in those lugs. Thus in the operative position of the apparatus as shown in Fig. 3 the pin could not be passed through the holes.

When it is desired to release the arm C and detach it from the member B the arm is lifted against the action of the spring G and the whole apparatus turns about the pivot A³. This brings the projection F' out of the path of the pin and that member is then placed in position in the holes A². The arm is then allowed to descend and the lower edge of the projection F' is caught upon the pin H so that the trigger is prevented from further downward movement and held stationary. The arm C and the member or socket B are allowed to descend further until the bottom edge of the member B rests upon the pin and in that position which is illustrated in Figs. 4 and 5, the trigger is clear from the hole C² so that the arm may be disengaged. To replace the apparatus in its operative position it is only necessary to engage the arm again with the plug B' and raise it slightly so as to lift the projection F' of the trigger from the pin H, the pin is then withdrawn and the trigger falls owing to the action of the spring G, locking the arm in position.

It will be understood that the object of making the arm detachable is that it may be removed and carried upon some convenient part of the vehicle when not required for immediate use. Vehicles fitted with apparatus according to this invention are usually required to travel for most of the time on roads where there is not any electric tramway and it is only at certain stages of the journey or at certain times of the day that the current-collecting and steering mechanism is required.

What I claim as my invention and desire to secure by Letters Patent is:—

1. Current-collecting and steering apparatus for an electrically propelled road vehicle comprising a pivoted spring-controlled member operatively connected to the stud axle of a steering road wheel, a detachable arm adapted to engage with the member, and a runner or shoe mounted on the detachable arm and adapted to engage with the groove and also with the flat portion of a track rail substantially as set forth.

2. Current-collecting and steering apparatus for an electrically propelled road vehicle comprising a pivoted spring-controlled member operatively connected to the stud axle of a steering road wheel, a detachable arm adapted to engage with the member, a runner or shoe mounted on the detachable arm and adapted to engage with the groove and also with the flat portion of a track rail, and a catch or trigger pivoted to the member and adapted to engage and retain the detachable arm.

3. In an electrically propelled road vehicle the combination of a stud axle, a plate or bracket secured thereto, lugs mounted on said bracket, a member pivoted between said lugs, a detachable arm adapted to engage said member, a removable pin passing through holes in the lugs and acting to hold the member and arm out of their operative positions, a catch or trigger pivoted to said member, a spring acting to press the member and the catch downward relatively to the lugs and a runner or shoe mounted on the detachable arm and adapted to engage with the groove and with the flat portion of a track rail substantially as set forth.

4. In current-collecting and steering apparatus for an electrically propelled road vehicle the combination with an arm operatively connected to the stud axle of a steering road wheel of a shoe having two portions D D' shaped and disposed in the manner set forth so that one portion engages with the groove of the track rail and the other makes electrical contact with the table or flat portion thereof.

In testimony whereof I have signed my name to this specification in the presence of two subscribing witnesses.

EDWARD CROSS.

Witnesses:
FREDERICK RENWICK,
JOHN LEIGH TURNER.

Copies of this patent may be obtained for five cents each, by addressing the "Commissioner of Patents, Washington, D. C."